United States Patent
Hashiguchi et al.

(10) Patent No.: US 6,804,629 B2
(45) Date of Patent: Oct. 12, 2004

(54) PRODUCTION MANAGEMENT SYSTEM AND SYSTEM FOR CHECKING OPERATING CONDITIONS OF PRODUCT PROCESSING APPARATUSES

(75) Inventors: Nobuki Hashiguchi, Ritto (JP); Katsuaki Kono, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 138 days.

(21) Appl. No.: 10/018,346

(22) PCT Filed: May 7, 2001

(86) PCT No.: PCT/JP01/03826

§ 371 (c)(1),
(2), (4) Date: Dec. 19, 2001

(87) PCT Pub. No.: WO01/86365

PCT Pub. Date: Nov. 15, 2001

(65) Prior Publication Data

US 2002/0161467 A1 Oct. 31, 2002

(30) Foreign Application Priority Data

May 12, 2000 (JP) .......................................... 2000-140279
May 12, 2000 (JP) .......................................... 2000-140280

(51) Int. Cl.[7] .......................... G06F 19/00; G06F 11/32
(52) U.S. Cl. ..................... 702/185; 700/110; 382/141; 348/89; 348/92; 348/125
(58) Field of Search ................................ 348/125, 130, 348/48, 86, 89, 92, 95, 47; 382/141; 700/110, 109; 702/188, 182, 185

(56) References Cited

U.S. PATENT DOCUMENTS

| | | | | |
|---|---|---|---|---|
| 5,001,889 A | * | 3/1991 | Mueller | 53/502 |
| 6,211,905 B1 | * | 4/2001 | Rudt et al. | 348/88 |
| 6,404,910 B1 | * | 6/2002 | Ungpiyakul et al. | 382/141 |
| 6,462,811 B1 | * | 10/2002 | Turner et al. | 356/237.1 |

* cited by examiner

Primary Examiner—Marc S. Hoff
Assistant Examiner—Paul L Kim
(74) Attorney, Agent, or Firm—Shinjyu Global IP Counselors, IP

(57) ABSTRACT

A production management system 1 includes a production line 2, a plurality of image-taking components 22 and a communications line 5. The production line 2 includes a combination weigher 2a and a bagger 2b. The communications line 5 is capable of distributing operating conditions from the combination weigher 2a and the bagger 2b. The plurality of image-taking components 22 are provided at the combination weigher 2a and the bagger 2b respectively, and are used for checking operating conditions. The communications line 5 is capable of distributing image information from the plurality of image-taking components 22. The present invention provides at low cost a production management system having a production line that includes a combination weigher and a bagger and is capable of using image information for monitoring.

14 Claims, 9 Drawing Sheets

Fig. 6

PRIOR ART

PRODUCTION MANAGEMENT SYSTEM AND SYSTEM FOR CHECKING OPERATING CONDITIONS OF PRODUCT PROCESSING APPARATUSES

TECHNICAL FIELD

The present invention relates to a production management system and a system for checking operating conditions of product processing apparatuses.

BACKGROUND TECHNOLOGY

Production lines where such products as mass-produced snacks are divided into a set quantity, either weight or number of pieces, and then put into individual bags, conventionally include various types of product processing apparatuses, such as a combination weigher, bagger, weight checker, seal checker and automatic box-packing apparatus. The processing flow in such a production line is as follows. First, the combination weigher is fed the product, which it divides into set quantities. The bagger then puts these divided quantities into individual bags, making them marketable packages. These marketable packages are then inspected by an inspection line, consisting of such apparatuses as a metal detector, weight checker, and seal checker, and any substandard products are rejected. At the end, satisfactory products are packed into boxes by the box packager.

FIG. 9 shows a conceptual diagram of an operating conditions control system for a production line that includes a conventional weighing machine. The control system shown in FIG. 9 includes product processing apparatuses 101, a host terminal 102 for monitoring such apparatuses, and a dedicated line 103, such as an RS 485 or an ARCNET. The product processing apparatuses 101 are interconnected with remote control units 104 for operating the apparatuses. These RCUs 104 have a communications board, and these communication boards and the communications board in the host terminal are interconnected by the dedicated line 103.

Production lines that include weighing machines need to be able to produce a diverse array of products, meaning that apparatuses have to be adjusted so as to be in the optimal state for each different product. Specifically, adjustments are required depending upon such factors as product size, nature of the product (fragility, stickiness, transport state) and ability to process production requests. When production processing has to be performed at a particularly high capacity, the apparatuses must be adjusted precisely, or else the production demands will not be met. In addition, along with the adjustments for the apparatuses, balance among the various apparatuses is important for a production line; in order for a production line to operate properly, adjustments have to be made that take into account the line as a whole. In this case, adjustments will be made at the site, while actual production of the products is ongoing, meaning that both the product production conditions and the operations of the individual apparatuses need to be watched simultaneously.

Furthermore, the more strictly apparatus adjustment is made, the more frequently do snags arise in the processing that an apparatus performs, meaning that the state of the production line requires constant monitoring.

Thus in production lines that include weighing apparatuses, the operating conditions of the product processing apparatuses 101 are monitored by a variety of sensors. Image information is particularly helpful to an operator in determining operating conditions.

However, in order to provide image information of operating conditions, a constitution is employed where, as shown in the figure, each product processing apparatus 101 is provided with image-taking means 105 (such as a CCD camera); display means 106 (such as a liquid crystal panel) is connected thereto via a dedicated line 107. Because dedicated lines are used for image display, the cost of such a constitution is high, and there are problems such as the need for space for these devices.

Moreover, in a system as shown in FIG. 9, while an operator can accurately confirm operating conditions for a processing device and make appropriate adjustments, the operating condition image information is not managed in such a way so that it can be put to use at a later time. Thus when abnormal conditions occur at a product processing apparatus, normally a warning is given to the operator, but the operator is able only to see operating conditions after a certain amount of time has elapsed since occurrence of the abnormality, and is not able to see operating conditions before and after the occurrence. Thus it is difficult to determine the cause of the abnormality.

DISCLOSURE OF THE INVENTION

It is an object of the present invention is to provide an inexpensive production management system that has a production line that includes a combination weigher and bagger and is capable of image-information based monitoring, and to allow for image information to be used effectively in checking the operating conditions of product processing apparatuses.

The production management system of the first aspect of the present invention includes a production line, a plurality of image-taking means, and a network. The production line includes such product processing apparatuses as a combination weigher and bagger. In other words, this production line has at least a combination weigher and bagger, and if necessary can have other product processing apparatuses. The network ties together the product processing apparatuses. The plurality of image-taking means are set up at the various product processing apparatuses and are used for taking images of operating conditions. The network distributes the image information from the plurality of image-taking means. It should be noted that image information includes both moving images and still images.

In this system, image information is distributed along with other operating conditions over the network, and is used at each apparatus. Because the distribution of this image information uses ordinary communications means, the system is inexpensive.

The production management system of the second aspect of the present invention is the production management system of the first aspect, wherein Ethernet or a wireless LAN is used as the network.

Using Ethernet allows for greater flexibility, through the use of Internet and intranet technology; using a wireless LAN results in fewer restrictions in terms of location.

The production management system of the third aspect of the present invention is the production management system of either of the first or second aspect, also including control means for controlling the apparatuses based on image information distributed by the network.

This system achieves more precise control of the product processing apparatuses through the use of image information.

The production management system of the fourth aspect is the production management system of any of the first through aspects, also including warning means for comparing image information with reference information and issuing a warning when necessary.

Because this system uses image information in the detection of abnormalities in apparatuses, it can more accurately detect abnormalities.

The production management system of the fifth aspect is the production management system of any of the first through fourth aspects, also including storage means for storing image information.

This system makes effective use of image information.

The product processing apparatus operating conditions check system of the sixth aspect of the present invention includes image-taking means for taking images of operating conditions and storage means for storing image information obtained by image-taking means. Here, "product processing apparatus" means any type of apparatus that is capable of performing at least one of the functions of measuring, packaging, inspecting a product or packing it into boxes. Image information refers to both moving and still images.

Because with this system, images of operating conditions of product processing apparatuses are stored, a user can use stored image information to check operating conditions of product processing apparatuses.

The product processing apparatus operating conditions check system of the seventh aspect of the present invention is the product processing apparatus operating conditions check system of the sixth aspect, wherein image information relating to operating conditions from a plurality of locations on a product processing apparatus is stored.

Because with this system, operating conditions from a plurality of locations of a product processing apparatus are stored as image information, a user can accurately grasp the operating conditions of a product processing apparatus as a whole.

The product processing apparatus operating conditions check system of the eighth aspect of the present invention is the product processing apparatus operating conditions check system of either of the sixth or seventh aspect, wherein storage means stores image information from image-taking means corresponding to operating conditions for different times. As used herein, image information that corresponds to operating conditions for different times includes a plurality of still images or moving images taken at different times (this can be thought of as consisting of images from a plurality of times).

Because with this system, operating conditions of a product processing apparatus are stored as image information from a plurality of different times, a user can get a view of operating conditions for a product processing apparatus at a specific time or during a specific time frame. The product processing apparatus operating conditions check system of the ninth aspect of the present invention is the product processing apparatus operating conditions check system of any of the sixth through eighth aspects, also including abnormality detection means for detecting abnormalities in operating conditions of a product processing apparatus.

The product processing apparatus operating conditions check system of the tenth aspect of the present invention is the product processing apparatus operating conditions check system of the ninth aspect, further including display means for displaying image information. When such display means accepts information of detection of abnormality from abnormality detection means, it displays image information, which has been stored by storage means, of the location where the abnormality has arisen from before and after detection of abnormality.

With this system, an operator of processing apparatuses can, while product processing apparatuses are in operation, view operating conditions from before and after the onset of the abnormality, thus making it easier to determine the cause of the abnormality.

The product processing apparatus operating conditions check system of the eleventh aspect of the present invention is used in a production line made of a plurality of product processing apparatuses, and includes image-taking means, first storage means and an image distribution device. Image-taking means is a means for taking images of operating conditions of the product processing apparatuses. First storage means is a means for storing image information obtained by image-taking means. The image distribution device has the ability to distribute image information stored by first storage means.

With this system, because images of the product processing apparatuses are stored and distributed, there is greater latitude in terms of where a user must physically be in order to use image information to check the operating conditions of the product processing apparatuses.

The product processing apparatus operating conditions check system of the twelfth aspect of the present invention is the product processing apparatus operating conditions check system of the eleventh aspect, further including second storage means for storing image information distributed from the image distribution device.

With this system, because images of operating conditions of the product processing apparatuses are stored at the places where they have been distributed, a user can make effective use of stored image information for checking operating conditions of the product processing apparatuses.

The product processing apparatus operating conditions check system of the thirteenth aspect of the present invention is the product processing apparatus operating conditions check system of the twelfth aspect, wherein second storage means stores image information corresponding to operating conditions of a plurality of product processing apparatuses, to operating conditions at a plurality of locations on each product processing apparatus, or to operating conditions at different times.

With this system, because a user can use image information relating to operating conditions at a plurality of locations or a plurality of times, the user is able to get an accurate picture of the overall operating conditions of a product processing apparatus.

The product processing apparatus operating conditions check system of the fourteenth aspect of the present invention is the product processing apparatus operating conditions check system of any of the eleventh through thirteenth aspects, further including abnormality detectian means for detecting abnormalities in the operating conditions of a product processing apparatus.

The product processing apparatus operating conditions check system of the fifteenth aspect of the present invention is the product processing apparatus operating conditions check system of the fourteenth aspect, further including display means for displaying image information. When display means receives information of detection of abnormality from abnormality detection means, it displays image information of the abnormal locations before and after the detection of abnormality, such image information being stored in second storage means.

With this system, an operator of a processing apparatus can, while a product processing apparatus is in operation, view the operating conditions before and after the abnormality arose, facilitating the identification of the cause of the abnormality.

A BRIEF EXPLANATION OF THE DRAWINGS

FIG. 6 is an example of operating information displayed on a web browser (preset information).

PREFERRED EMBODIMENTS (1) Overall Constitution

Figure 1:
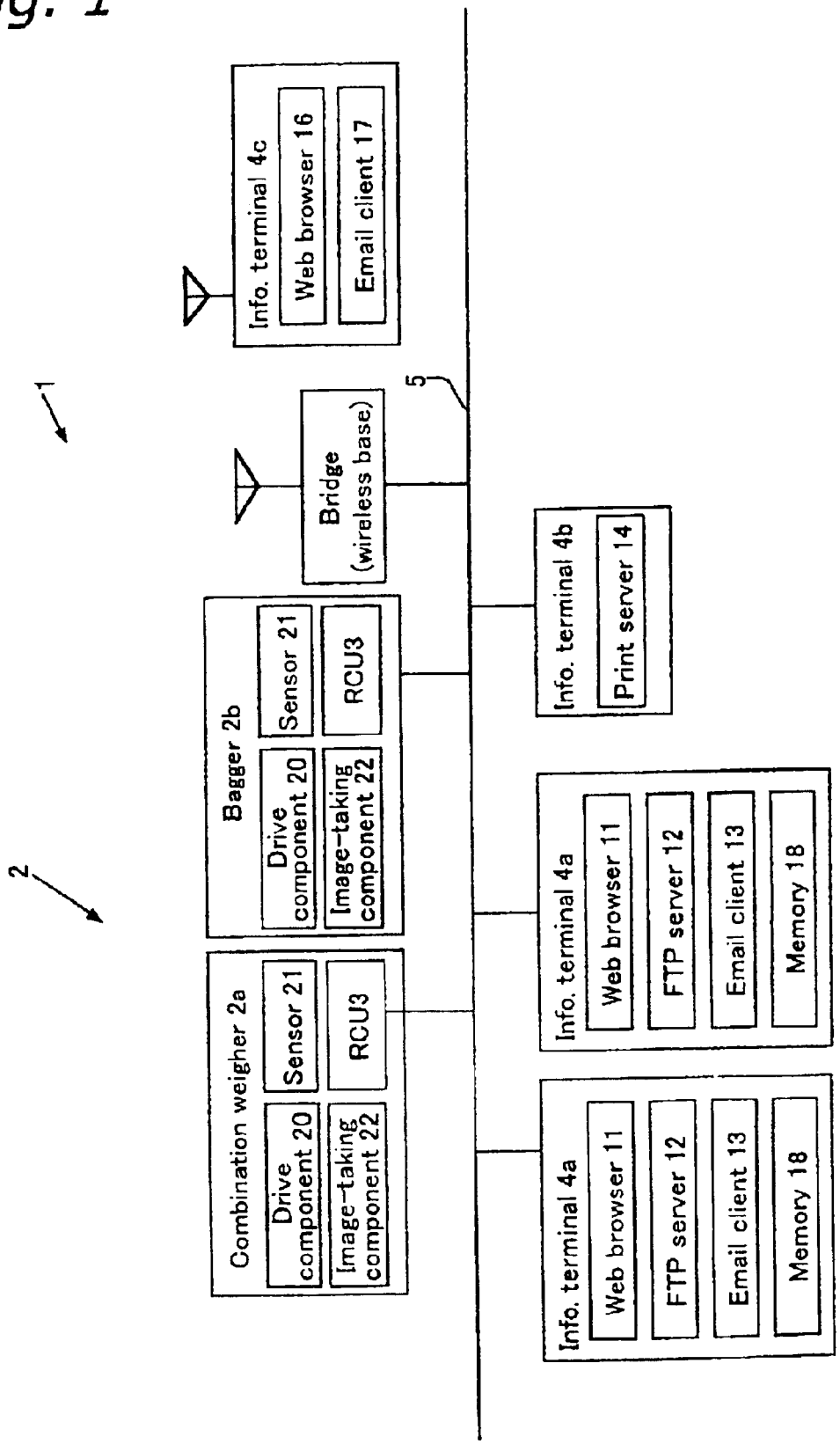
FIG. 1 is a conceptual illustration of a production management system relating to a first embodiment of the present invention.

FIG. 1 shows the overall constitution of a production management system relating to the present invention.

This system 1 comprises a production line 2, information terminals 4a, 4b, 4c (an example of image-information-demanding means), and a communications circuit 5.

Figure 2:
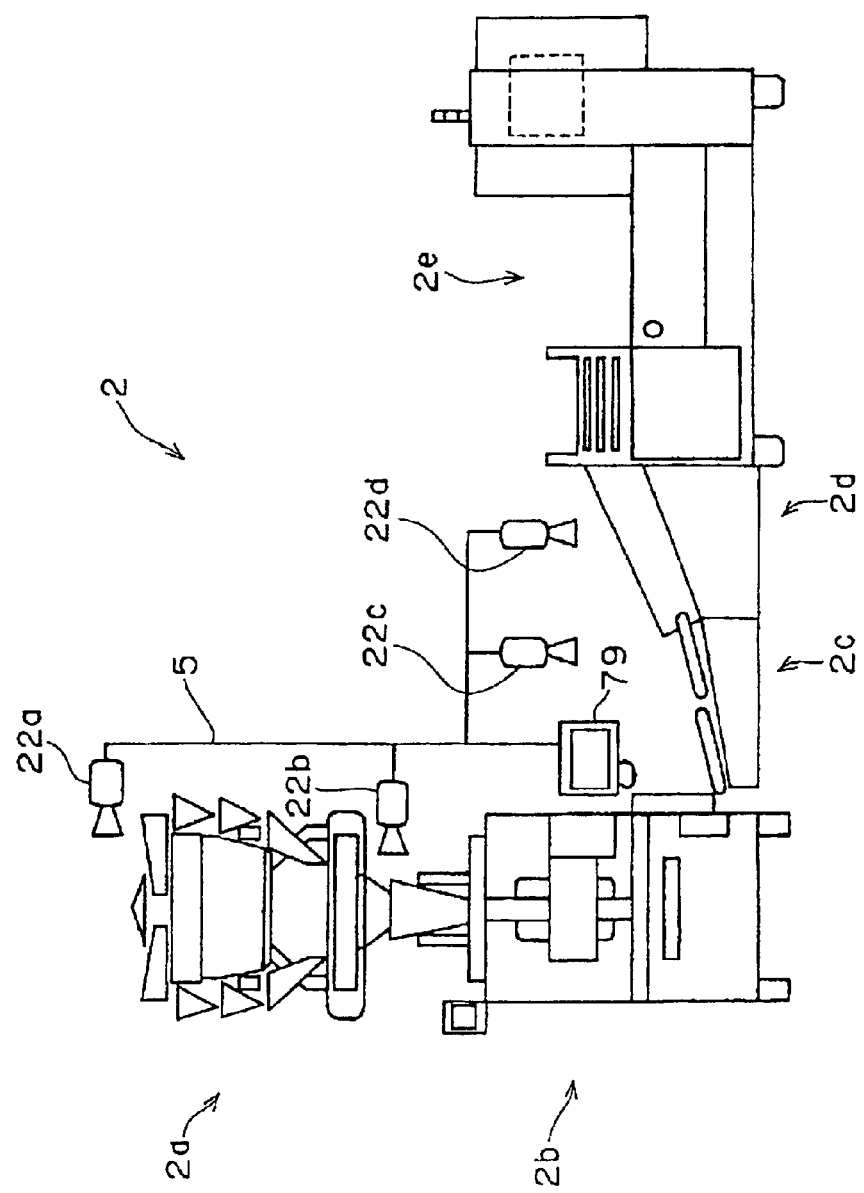
FIG. 2 is a schematic illustration of a production system.

The production line 2 is a line for conducting the processes of measuring out set amounts of a product such as a food product or industrial part, of putting the product into bags and then performing quality checks, and finally of packing the bagged product into boxes. As shown in FIG. 2, the production line 2 comprises product processing apparatuses 2a through 2d. Specifically, these product processing apparatuses are a combination weigher 2a, a bagger 2b, a weight checker 2c, a seal checker 2d, and a packager 2e. The production line 2 also has a feeder, a metal detector, a remover and the like. As will be described below, each product processing apparatus 2a through 2d is equipped with a remote control unit (RCU) 3 for controlling the product processing apparatus. Included in the RCU 3 are a web server 34, an email client 35, an FTP client 36, a print client 37, and the like (see FIG. 3). The product processing apparatuses will be described below.

The information terminal 4a may be a personal computer, work station or the like; it is connected to the communications line 5 via a network interface. The information terminal 4a has a web browser 11, an FTP server 12, and an email client 13, as well as a memory 18. The web browser 11 can access the web server 34 of the product processing apparatus (2a through 2d). The web browser 11 uses IP addresses and the like to identify the product processing apparatus (2a through 2d) with which it is to communicate, and causes the display of HTML documents and the like stored in the web server 34 thereof. The FTP server 12 can send files to and receive files from the FTP client 36. The email client 13 can receive email from the email server (not shown in figure). The information terminal 4a also has a memory 18 (second memory means). The memory 18 stores the aforementioned HTML documents, email and files sent from other communicating parties. The memory 18 is used in particular for the storage of various types of image files sent to the FTP server 12 from the FTP client 36.

The information terminal 4b has a print server 14, and is connected to the communications line 5 via a network interface. The information terminal 4b is connected to a printer, which is not shown in the figure. The print server 14 receives print signals from the print client 37 which it prints out at the printer.

The communications line 5 is connected to an email server, which is not shown in the figure. The email server saves for each address email sent from the email clients 13 and such. The email server has a push function; when it receives email from an email client 35, the email server immediately distributes emails to the designated email client 13 or 17.

The information terminal 4c is a portable wireless handset such as a personal handyphone system or pager. The information terminal 4c has a web browser 16 and an email client 17. The information terminal 4c is connected to the communications line 5 via a bridge (wireless base) 6. If transmission is to be made to a portable wireless handset, the bridge 6 wirelessly transmits data to that portable wireless handset, based on data on the network. If transmission is to be made to a portable wireless handset, the protocols are different from standard wireless transmission; thus the bridge 6 is capable of protocol conversion.

The communications line 5 can be a local area network (LAN) comprising a 10 base-T Ethernet circuit, hubs, and routers. This communication circuit uses the TCP/IP protocol.

(2) Constitution of a Product Processing Apparatus

Figure 3:
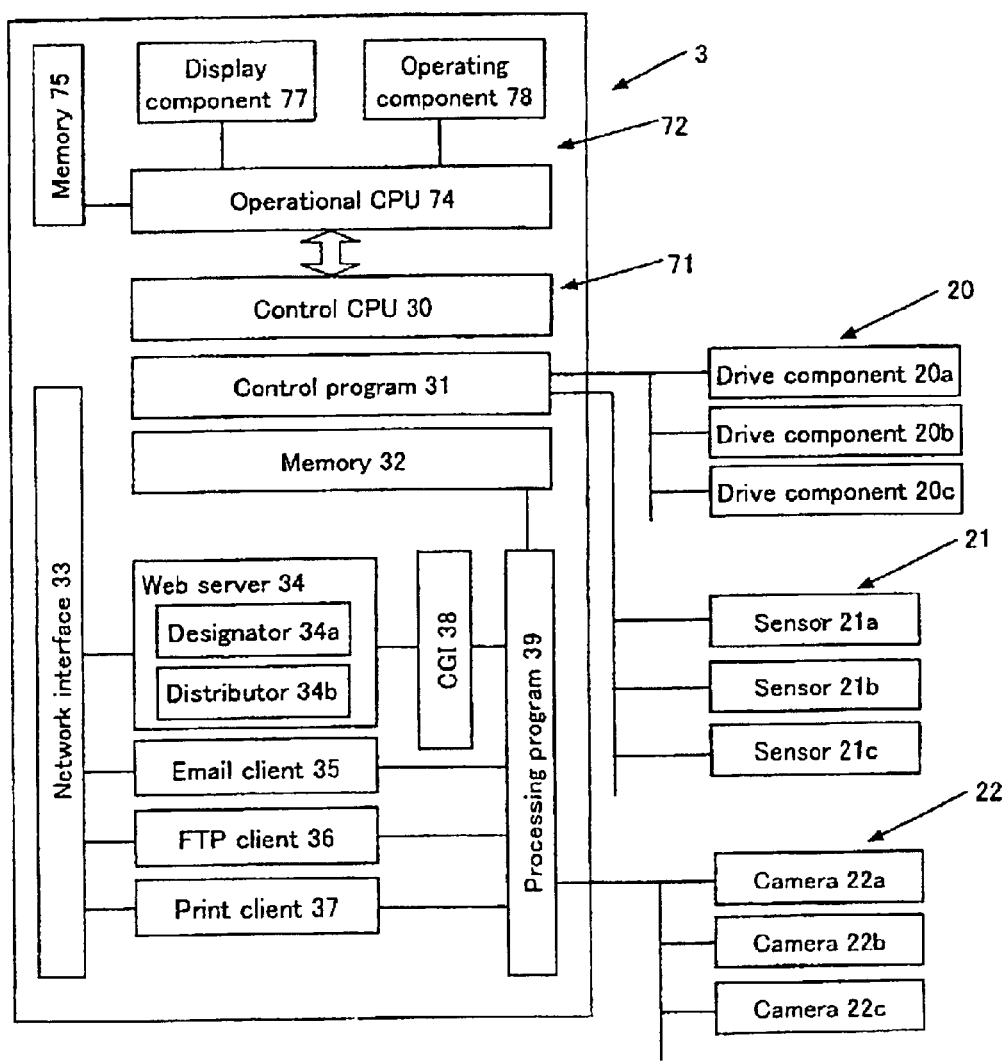
FIG. 3 is a block diagram of the functions of a product processing apparatus and an RCU.

As shown in FIG. 3, the product processing apparatus (2a through 2d) includes an RCU 3 that controls the overall product processing apparatus. The RCU 3 has a drive control component 71 that processes signals from a sensor 21 and controls a drive component 20, and an operations processing component 72 where operating information for each apparatus is inputted and displayed.

The drive components 20 are for driving various types of mechanisms of the product processing apparatuses 2a through 2e. For example, the drive component 20 of the combining weighing apparatus 2a can be a dispersion feeder, scatter feeder, pool hopper, weight hopper and the like, and the drive component 20 of the weight checker 2c can be a conveyer drive motor and the like.

The sensors 21 detect mass in accordance with the processing carried out by each product processing apparatus 2a through 2e. For example, with the combination weigher 2a, the sensor 21 can be a weight measuring sensor such as a load cell or a photocell for detecting feed volume.

The image-taking components 22 comprise a plurality of cameras 22a, 22b, 22c, and image file conversion means (not shown). The cameras 22a, 22b and 22c can be a variety of cameras, such as TV cameras or CCD cameras.

As shown in FIG. 2, the cameras 22a, 22b, 22c and 22d are provided at locations where sight-based adjustments will be needed or where abnormalities are likely to occur. Locations where visual adjustment or confirmation is required would be the dispersion feeder and drive feeder of the combination weigher 2a. The camera 22a is for confirming feed conditions (volume, transport speed, balance of the dispersion component, congestion) at the feed component and the appropriateness of setting parameters. While not shown in the figure, a camera may be set up at the weight hopper of the combination weigher 2a, for confirming whether products are being transported from the hopper and confirming the appropriateness of setting parameters relating to opening and closing times. Places where abnormalities are likely to occur would be such places where transport errors are conceivable, at connections between machines and at movable parts along the entire transport path. In the present embodiment, the camera 22b is disposed between the combination weigher 2a and the bagger 2b, where the machines are connected and where it is easy to see if products have become stuck. It may also be disposed between the discharge opening of the bagger 2b and the rise conveyer, where it is easy to confirm if bags are being torn. Also in the present embodiment, the cameras 22c and 22d are provided for the weight checker 2c and the seal checker 2d, respectively. Cameras may also be provided for transport components of the metal detector, x-ray detector and the like. Transport errors involving moving parts that can easily occur include a product getting lodged in the weight hopper of the combination weigher 2a, a product getting lodged in the bagger 2b, an absorption error at a product absorption component of the packager 2e, and errors in packing the product into boxes, and cameras may be provided at the appropriate locations to monitor these. In addition, cameras may be provided at printing apparatuses (labeler, marking apparatus) to monitor printing or labeling components.

The drive control component 71 comprises a control CPU 30, control programs 31, a memory 32, a network interface 33, a web server 34, an email client 35, an FTP client 36, a print client 37, a common gateway interface (CGI) 38, and processing programs 39.

The control CPU 30 executes, monitors and controls the control programs 31, the network interface 33, the web server 34, the email client 35, the FTP client 36, the print client 37, the CGI 38 and the processing programs 39. The control CPU 30 also writes information to and reads information from the memory 32.

The control programs 31 are connected to the drive components 20a, 20b, and 20c, and to sensors 21a, 21b, and 21c; they conduct drive control of the drive components 20, processing of signals from the sensors 21, and control of the product processing apparatuses overall. For example, in the case of the combination weigher 2a, the control programs 31 drive the dispersion feeder, scatter feeder, and pool hopper, and send products to the weight hopper. Thereafter, they conduct combination weighing based on weight signals from the load cell connected to the weight hopper. Then they drive the weight hopper corresponding to the combination results and cause the product to be discharged. They also cause operating information such as error information, drive conditions, and operational conditions to be stored in the memory 32. Error information is such matters as a product processing apparatus stopping, drive malfunction in a drive component, sensor abnormalities and the like. They also cause image information before and after the occurrence of an abnormality of operating conditions of locations where an abnormality occurred, or else a plurality of still images, to be stored in memory.

Figure 6:
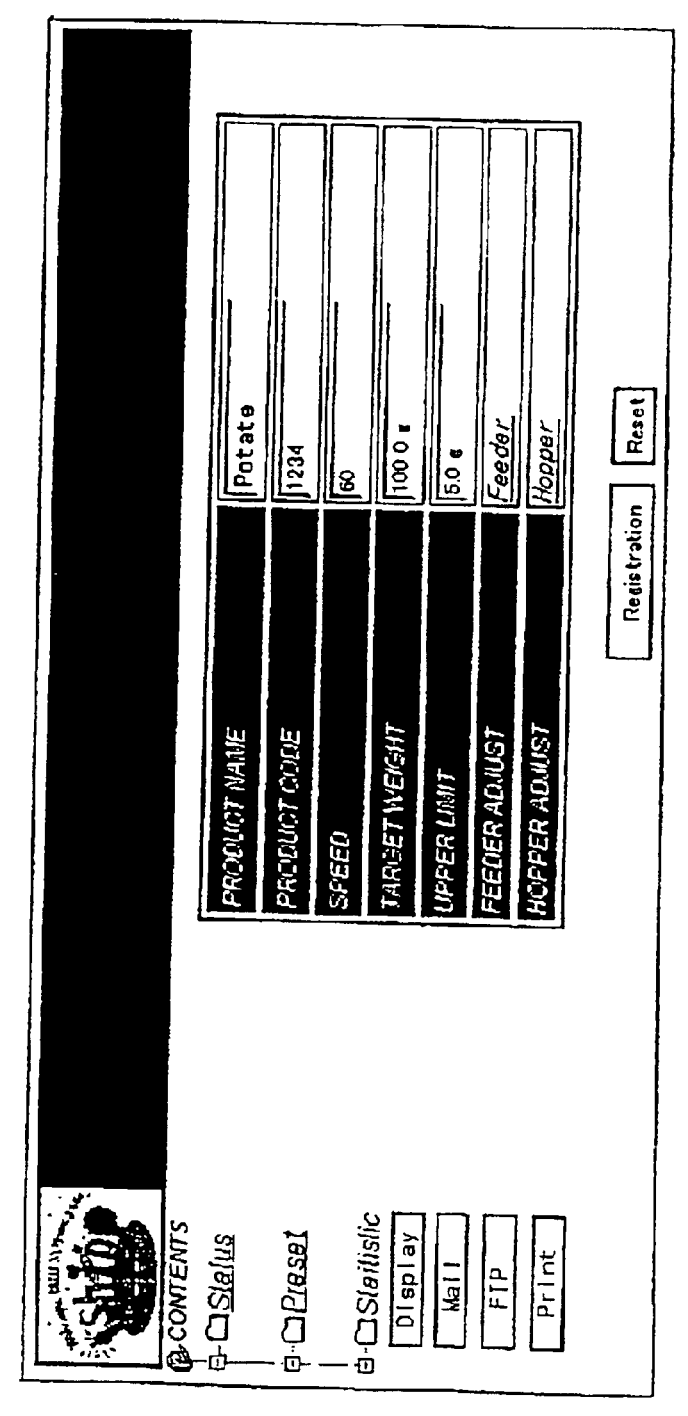

As shown in FIG. 6, which will be discussed below, drive conditions ("STATUS") are product name ("PRODUCT NAME"), product code ("PRODUCT CODE"), weighing speed ("SPEED"), target weight ("TARGET WEIGHT"), upper weight limit ("UPPER LIMIT"), feeder adjustment ("FEEDER ADJUST"), hopper adjustment ("HOPPER ADJUST") and the like.

Figure 7:
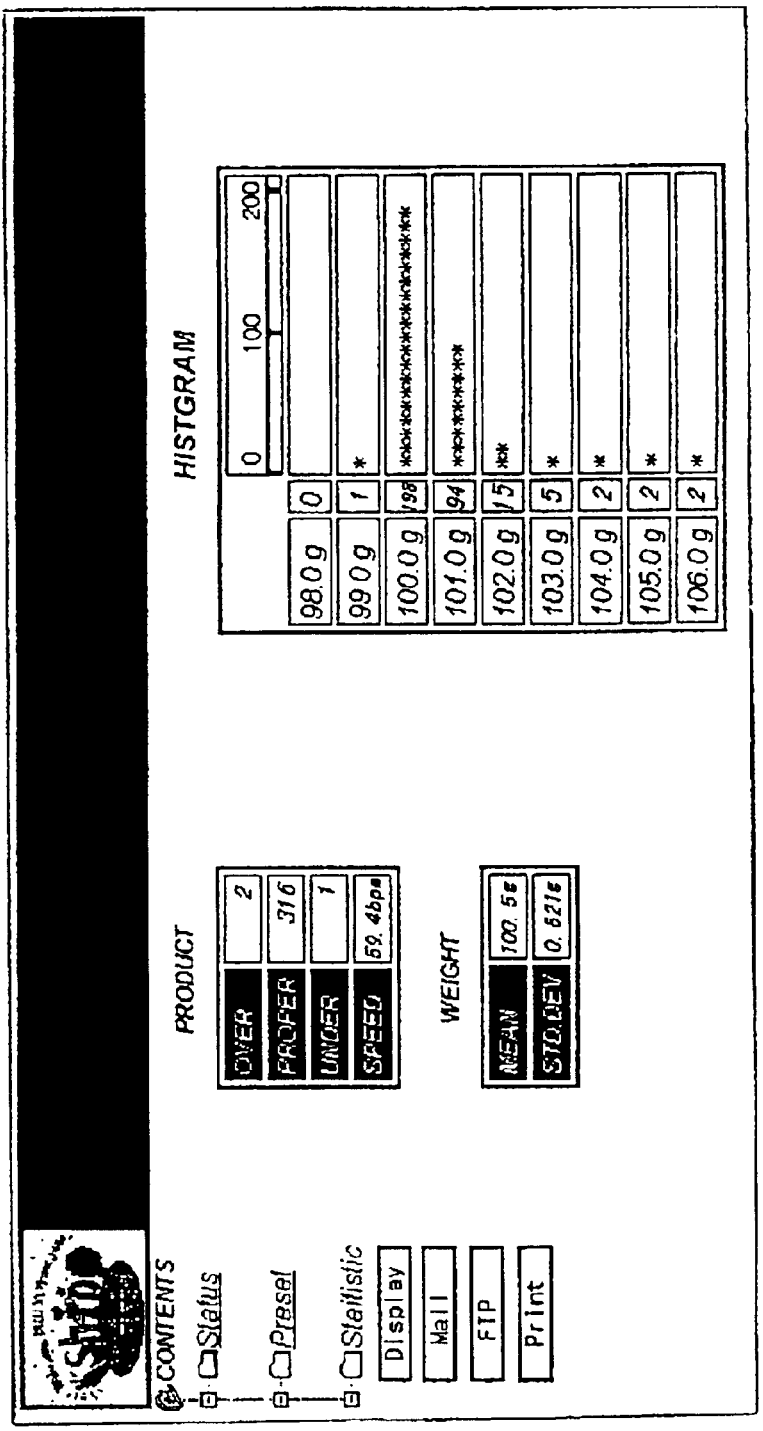
FIG. 7 is an example of operating information displayed on a web browser (statistic information).

As shown in FIG. 7, which will be discussed below, operating conditions are excess weight/number ("OVER"), proper weight/number ("PROPER"), insufficient weight/number ("UNDER"), processing speed ("SPEED"), proper weight mean ("MEAN"), statistical deviation for proper weight (STD. DEV.), histogram of weights ("HISTOGRAM") and the like.

Stored in the memory 32 (first storage means) are the following: the aforementioned error information, drive conditions, and operating conditions, as well as HTML documents used by the web server 34 (to be discussed below), image files created by image file conversion means, email used by the email client 35 (to be discussed below), print data used by the FTP client 36 (to be discussed below) and the like.

The network interface 33 can be, for example, a LAN adapter, and it uses the TCP/IP protocols. A unique IP address is established on the LAN for each apparatus. The network interface 33 is interconnected with the communications line 5, the web server 34, the email client 35, the FTP client 36 and the print client 37.

The web server 34 comprises a designator 34a and a distributor 34b. The designator 34a, based on instructions from the web browser 11 (to be discussed below), designates execution contents as well as the object of such execution. The distributor 34b displays the aforementioned object of execution. Execution contents is the displaying of HTML documents stored in the memory 32 or instructing the CGI 38 to execute the processing program 39, and the like. Object of execution is operating information stored in the memory 32, such as error information, drive information, operating conditions, image files and the like, as well as email data, file data, and print data. The web browser 11 and the web server 34 communicate using HTTP (hypertext transfer protocol).

The email client 35 sends email stored in the memory 32 to an email server (not shown in figure). For email transmissions, such protocols as POP (post office protocol), SMTP (simple mail transfer protocol) and IMAP (Internet message access protocol) can be used.

The FTP client 36 transmits files stored in the memory 32 to the FTP server 12 of the information terminal 4a. Transmissions between the FTP server and FTP client are conducted using the file transfer protocol (FTP).

The print client 37 transmits print data or image data stored in the memory 32 to the information terminal 4b, which includes a print server. Transmissions between the print server and print client are conducted, for example, using the LPS/LPD protocols. The protocol should be print protocols using TCP/IP.

The CGI 38, based on the execution contents and execution object designated by the designator 34a, activates the processing programs 39. This CGI 38 is written in Perl (Practical Extraction and Report Language). The CGI 38 delivers information between the web server 34 and the processing programs 39, and activates processing programs at the web server 34. The CGI 38 comprises a plurality of separate programs corresponding to the aforementioned designations. In the case that the execution contents calls for display, the CGI 38 receives the contents to be displayed from the processing programs 39, converts this to HTML format, and passes this on to the web server 34.

The processing programs 39 execute programs that are based on designations received from the CGI 38, conduct email transmission of error information when an error arises, or write to the memory 32 image files converted by image file conversion means. The processing programs 39 also comprise a plurality of programs corresponding to execution contents and object of execution.

Figure 4:
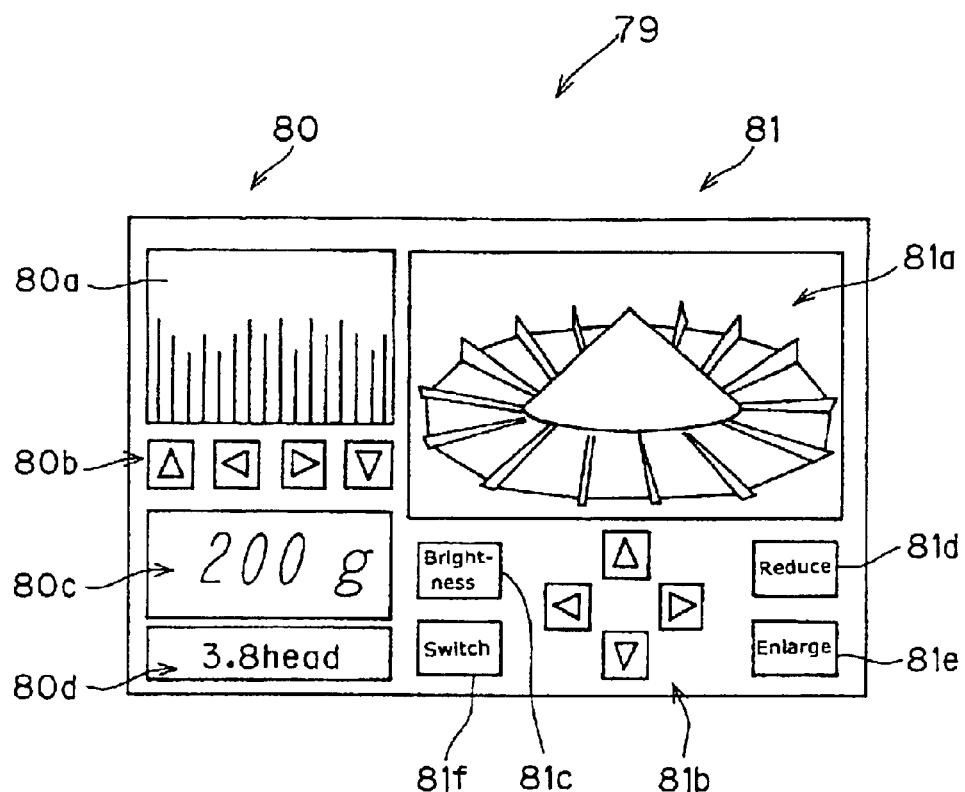
FIG. 4 is an example of a screen displayed at an operating unit.

An explanation will now be given of the operations processing component 72. The operations processing component 72 mainly comprises the operational CPU 74 and memory 75. The operational CPU 74 is capable of sending and receiving signals to and from the CPU 30. The operational CPU 74 is connected to a display component 77 and an operating component 78. The display component 77 is a device such as a liquid crystal display or a CRT capable of graphic display. The operating component 78 is a type of pointing device, such as a keyboard, touch panel, or mouse. The memory 75 is used primarily as memory for display. In this embodiment, the display component 77 and operating component 78 are integrated as a touch panel that forms the operating unit 79. The operating unit 79, as shown in FIG. 4, has on the left side a manipulation/display component 80 that has a display component that displays the operating conditions of the apparatus in question using numbers and graphs, and on the right side, an image information display component 81 in which are disposed image information and various types of keys for changing that image information. FIG. 4 shows an operating unit 79 provided for the combination weigher 2a. Displayed at the operational display unit 80 are a scatter feeder drive intensity display 80a, a feeder adjustment key 80b, a combination weight value 80c, and a discharge head number 80d. Displayed at the image information display component 81 are an image 81a taken of the dispersion feeder and scatter feeder, an image angle adjustment key 8ab, a brightness key 81c, a reduce display key 81d, an enlarge display key 81e, and a camera channel switch key 81f.

Switching the camera channel causes the display of image data of a different part of the combination weigher 2a, for example, the weighing hopper. Thus because a plurality of cameras (22a, 22b, 22c) are provided, a plurality of image information can be checked from one location; production conditions can be grasped, monitoring of locations where abnormalities have occurred can be monitored, and locations where malfunctions have occurred can be checked. Image information can be particularly useful in making adjustments when a feeder needs adjusting or when an item has become lodged in a hopper. In addition, the operating unit 79 allows adjustment of apparatuses to be performed from a single location. Conventionally, an operating unit has to be moved to the location needing visual inspection, or an operating component has to be provided at a location other than the standard location, or else an operator has to relocate to a location from which he can make visual inspection in order to get a grasp on operating conditions. With the present invention, however, these problems do not arise.

(3) Processing of Image Information Taken by the Image-taking Component

An explain will now be given of the processing in this production management system, in particular, the processing of image information taken by the image-taking component.

At the image-taking component images inputted by a camera (i.e., cameras 22a, 22b, 22c, etc.) are subjected to A/D conversion or compression (into JPEG, MPEB, H261 format or the like), delivered to the processing program 39 and then stored in the memory 32.

At the memory 32, image information is stored relating to the operating conditions at a plurality of locations of the product processing apparatuses 2a, 2b, and 2c. The image information may be moving images, or it may be a plurality of still images, or it may be a combination of moving and still images. In any case, image information relating to operating conditions from different times at each location is stored in the memory 32. Image information relating to operating conditions from different times means a plurality of still images or moving images taken at different times of day (these can be thought of as images from a plurality of different times).

For example, let us suppose that an operator manipulates the operating component 78 at the RCU 3 of the combination weigher 2a and requests images from near the dispersion feeder. In this case, the operational CPU 74 requests from the control CPU 30 images from near the dispersion feeder. The control CPU 30 reads image information from the memory 32 and sends this to the operational CPU 74. The operational CPU 74 writes this image information to the memory 75 and causes the display thereof at the display component 77.

In this embodiment, all image information taken by the image-taking component 22 is stored in the memory 32. Therefore, an operator can, when necessary, view not just real-time displays but past image information too. It is preferable that the operating panel 79 have a key allowing for selection between real-time display and display from the time that an error occurred. When an operator selects display from the time that an error occurred, moving images or a plurality of still images from the time before and after the occurrence of an abnormality are displayed. This allows an operator to view operating conditions before the occurrence of an abnormality, at the instant that an abnormality occurred, and after the occurrence of an abnormality, and facilitates the diagnosis of the cause of the abnormality and the choice of measures to be taken in response thereto. Conventionally, when investigating the cause of an abnormality, it has been necessary to recreate the abnormality in order to understand the conditions under which the original abnormality occurred; for errors and abnormalities that are not readily recreated, this meant that a great deal of time and effort was needed in order to confirm the phenomenon behind the abnormality.

The system may also be configured so that when there is an abnormality in an apparatus, moving images or a plurality of still images from before and after the occurrence of the abnormality are automatically displayed. Specifically, when an abnormality in an apparatus is detected based on information from the sensors 21a through 21c, the CPU 30 reads from the memory 75 image information from before and after occurrence of the abnormality, sends this to the CPU 74, and causes the display component 77 to display it.

The system may also be configured so that when an abnormality occurs, the CPU 30 sends a warning signal to the operational CPU 74, and the operational CPU 74 prompts an operator to take heed by displaying warning information at the display component 77 or issuing a warning sound.

The CPU 30 can also drive the drive components 20a through 20c based on image information sent from the image-taking component to control the combination weigher 2a. The CPU 30 can also compare the inputted image information against reference image information in order to detect the occurrence of an abnormality. This makes possible the checking of label-printing conditions and transport conditions. Reference images are images of non-defective products, registered beforehand as templates, and these are compared against the inputted image information using such methods as the sequential similarity detection algorithm or normal correlation matching. Reference image information is sent from the information terminals 4a and 4b and stored in the memory 32.

Figure 5:
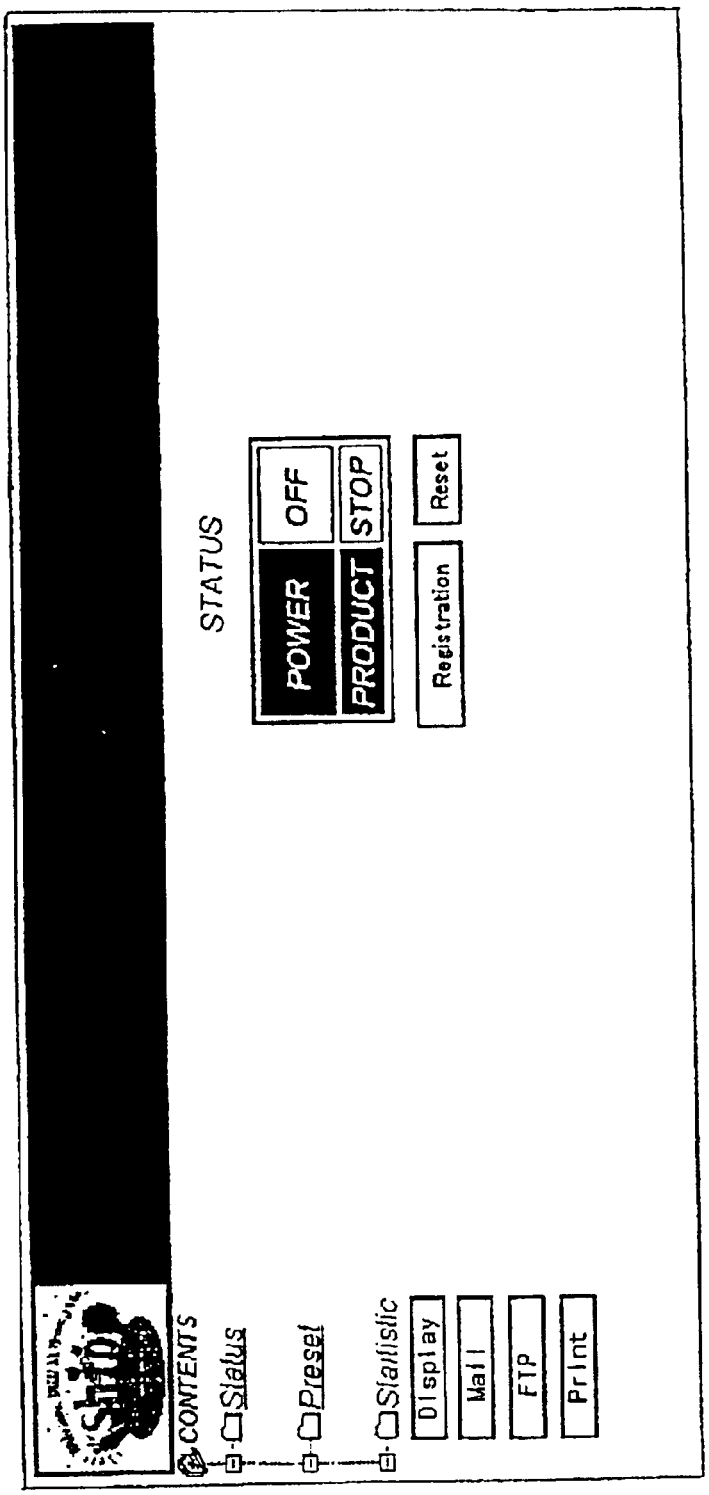
FIG. 5 is an example of operating information displayed on a web browser (status information).

(4) Examples of Display of and Settings for Operating Information of Product Processing Apparatuses at an Information Terminal FIGS. 5 to 7 show examples of screens provided by the web server 34 and CGI 38 and displayed by the web browser 11 of the information terminal 4a. These figures show operating information of a combination weigher that is combining and weighing potato chips.

The left side of the display portion in each figure is a menu screen displayed when a request from the web browser 11 for access to the web page of the combination weigher 2*a* has been authorized. In FIGS. 5 to 7 the three items of "Status" (settings and display for overall operations of the apparatus), "Preset" (advance settings), and "Statistics" (display of operating conditions) are displayed as operating information options. Beneath "Statistics," the operating conditions output options of "Display," "Email," "FTP" and "Print" are displayed.

The screen example of FIG. 5 is an example of a screen displayed when "Status" is selected. On this "Status" screen, the overall operations of the combination weigher 2*a* are displayed. In this example, whether the device is on or off and whether the production of the product has been stopped or is ongoing are displayed. If a user changes the apparatus on/off settings of the production start/stop settings and then clicks on the "Registration" button, operational control of the combination weigher will be conducted based on these settings.

The screen example shown in FIG. 6 is an example of a screen displayed when "Preset" is selected. On the "Preset" screen, parameter values showing the contents of advance settings are displayed. In this example, the name of the product being produced, its product code, weighing speed, target weight of one bag, upper weight limit and the like are displayed. When "Feeder adjust" and "Hopper adjust" are selected, more detailed settings for feeders and hoppers of the combination weigher 2*a* are displayed.

When a user wishes to change parameter values, the user writes in the new parameter values and clicks on the "Registration" button at the bottom of the screen. This causes the new parameter values to be written to the memory 32 of the combination weigher 2*a*, and based thereupon the control of the combination weigher 2*a* is conducted.

The screen example shown in FIG. 7 is an example of a screen displayed when "Display" under "Statistics" is selected. On the "Statistics" screen, actual operating conditions are displayed. In this example, number over weight, number at proper weight, number under weight, actual processing speed, average value of proper weight, standard deviation for proper weight, frequency distribution of weight values for each weight are displayed. Using the frequency distribution of weight values for each weight to display image information allows production status to be grasped at a single glance.

When a user selects any of "Email," "FTP" or "Print" as output for operating conditions, the aforementioned information can be outputted by the email client 17, FTP server 12, or print server 14.

5) Operations of the RCU in the Combination Weigher

Figure 8:
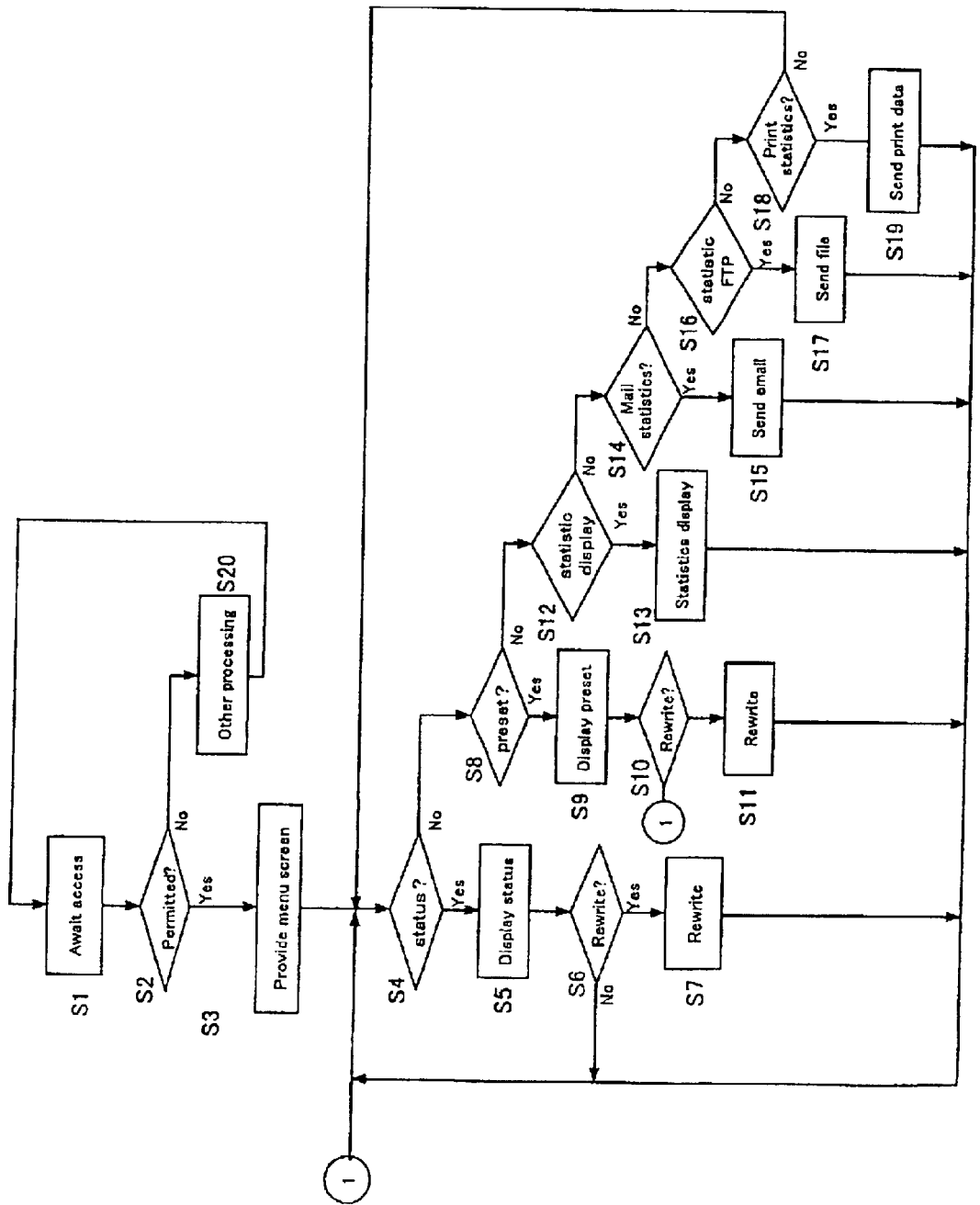
FIG. 8 is a flowchart showing one example of the flow of processing conducted by an RCU.
Figure 9:
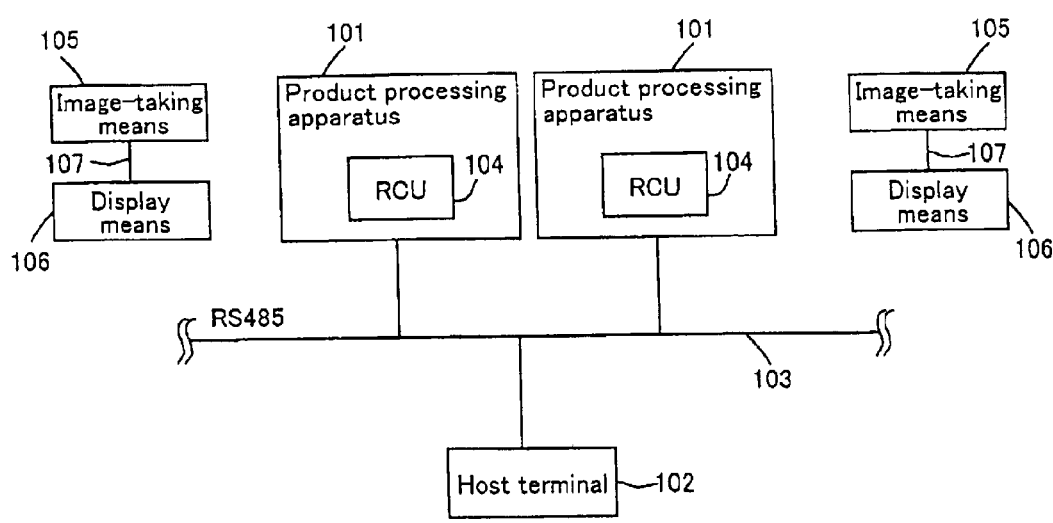
FIG. 9 is a conceptual diagram of a conventional control system.

FIG. 8 is a flowchart showing one example of the processing flow conducted by the RCU 3 of the combination weigher 2*a* of the present embodiment.

The web server 34 can be accessed from the web browser 11 on the information terminal 4*a* by inputting a URL (uniform resource locator) of the IP address assigned to the combination weigher 2*a*.

In Step S1, the web server 34 receives access from the web browser 11.

In Step S2, the web server 34 performs a predetermined authentication processing. For example, the web server 34 requests input of user ID and password, and allows access only when these match authentication information registered in advance in the memory 32. If access is allowed, control proceeds to Step S3; if access is denied, then control proceeds to Step S20, described below.

In Step S3, the web server 34, in order to receive selection of type of operating information, sends to the web browser a menu screen on which the left-hand side portion of FIG. 6 described above is displayed.

In Step S4 the web server 34 determines whether or not "Status" has been selected from the menu screen. If it determines "yes," then control proceeds to Step S5; if it determines "no," then control proceeds to Step S8 described below.

In Step S5, the web server 34 activates the CGI 38. The CGI 38 activates a processing program 39, which asks the control program 31 the status of the combination weigher 2*a*. The control program 31 replies to the processing program 39 by transmitting a signal corresponding to the status of the combination weigher 2*a* at that time. The processing program 39 converts the contents of the reply into HTML format, which it then transmits to the CGI 38. The CGI 38 provides the web server 34 with the HTML-formatted status or the combination weigher 2*a*. The web server 34 transmits the HTML-formatted status to the web browser 11. The web browser 11 displays a screen showing the status of the combination weigher 2*a*, for example, the screen in FIG. 5. Thereafter control proceeds to Step S6.

In Step S6, the web server 34 determines whether the apparatus on/off settings and production star/stop settings have been rewritten. More specifically, the web server 34 determines whether or not the user has clicked on the "registration" button. If it determines that it has been clicked, control proceeds to Step S7. If the user has not clicked on the "registration" button, control returns to Step S4, and awaits the selection of a type of operating information.

In Step S7, the web server 34 receives from the web browser 11 the parameters inputted by the user and activates the CGI 38. The CGI 38 activates a processing program 39, which changes the status of the combination weigher 2*a* for the control program 31. Then control returns to Step S4.

In Step S8, the web server 34 determines whether "Preset" has been selected from the menu screen. If it determines "Yes," then control proceeds to Step S9; if it determines "No," then control proceeds to Step S12, described below.

In Step S9, the web server 34 activates the CGI 38. The CGI 38 activates a processing program 39, which reads the drive conditions from the memory 32. The processing program 39 converts the drive conditions into HTML format and then sends the same to the CGI 38. The CGI 38 provides the web server 34 with the HTML-formatted drive conditions. The web server 34 transmits the HTML-formatted drive conditions to the web browser 11. The web browser 11 displays the drive conditions it has received in the manner, for example, as shown in FIG. 6. Thereafter control proceeds to Step S10.

In Step S10, the web server 34 determines whether parameters have been rewritten. Specifically, the web server 34 determines whether or not the "registration" button has been clicked. If it determines that it has been clicked, control proceeds to Step S11. If the user has not clicked on the "registration" button, control returns to Step S4.

In Step S11, the web server 34 receives from the web browser 11 parameters that the user has set and activates the CGI 38. The CGI 38 activates a processing program 39, which stores the rewritten drive conditions in the memory 32. Thereafter control returns to Step S4.

In Step S12, the web server 34 determines whether or not "Display" under "Statistics" has been selected or not. If it determines "Yes," control proceeds to Step 513. If it determines "No," then control proceeds to Step S14, described below.

In Step S13, the web server 34 activates the CGI 38. The CGI 38 activates a processing program 39, which reads operating conditions from the memory 32. The processing program 39 converts the operating conditions into HTML format and sends the same to the CGI 38. The CGI 38 provides the HTML-formatted operating conditions to the web server 34. The web server 34 sends the HTML-formatted operating conditions to the web browser 1. The web browser 11 displays the operating conditions it has received in the manner shown, for example, in FIG. 7. Thereafter control returns to Step S4.

In Step S14, the web server 34 determines whether "Mail" under "Statistics" on the menu screen has been selected. If it determines "Yes," then control proceeds to Step S15. If it determines "No," then control proceeds to Step S16, described below.

In Step S15, the web server 34 activates the CGI 38. The CGI 38 activates a processing program 39, which reads operating conditions from the memory 32. The processing program 39 converts the set email address as well as the contents of the reply into email format, which it writes to the memory 32. Thereafter, the processing program 39 activates the email client 35 and distributes the created email via the set email server. Thereafter control returns to Step S4.

In Step S16, the web server 34 determines whether "FTP" under "Statistics" has been selected from the menu screen. If it determines "Yes," then control proceeds to Step S17. If it determines "No," control proceeds to Step S18, described below.

In Step S17, the web server 34 activates the CGI 38. The CGI 38 activates a processing program 39, which reads operating conditions from the memory 32. The processing program 39 converts the contents of the reply into a file format, which it writes to the memory 32. Thereafter, it activates the FTP client 36, and causes it to distribute the created file to the set FTP server 12. Thereafter, control returns to Step S4.

In Step S18, the web server 34 determines whether or not "Print" under "Statistics" on the menu screen has been selected. If it determines "Yes," then control proceeds to Step S19. If it determines "No," then control returns to Step S4.

In Step S19, the web server 34 activates the CGI 38. The CGI 38 activates a processing program 39, which reads operating conditions from the memory 32. The processing program 39 converts the contents of what it has read into print data, which it writes to the memory 32. Thereafter, it activates the print client 37, and causes it to distribute the created print data to the set print server 14. Thereafter, control returns to Step S4.

In Step S2 above, if access from the web browser 11 is denied, control proceeds to Step S20. In Step S20, predetermined other processing is conducted. For example, the web server 34 transmits to the web browser 11 a message display screen such as "Access Denied."

An explanation will now be given of error occurrences. When an error occurs, error information is distributed by email. When an error occurs, the error information is stored in the memory 32 by the control program 31. Simultaneously thereto, the processing program 39 for error processing is activated by the control program 31. The processing program 39 for error processing calls the error information from the memory 32, converts the set email address and the image file of the operational problem stored at that time into email format, and writes these to the memory 32. Thereafter, the email client 35 is activated, the created email is sent to the email server, and the email server distributes the email. The error information may also be converted to file or print data format and then sent to the set FTP server 12 or print server 14.

The error information includes files comprising moving images or a plurality of still images of the location where an abnormality occurred taken before and after occurrence of an abnormality. Thus image information relating to the occurrence of an abnormality at a product processing apparatus is stored in the memory 32, and this image information is sent from the RCU 3 to the information terminal 4a via the communications line 5 and stored in the memory 18 of the information terminal 4a. The moving images or plurality of still images of the location where an abnormality occurred taken before and after occurrence of an abnormality, which are stored in the memory 18, are displayed at the time an abnormality occurs, and can be used to pinpoint the cause of the abnormality, and can be read out and used later when investigating the conditions behind the abnormality.

With the above-described constitution, the operating conditions of a plurality of product processing apparatuses, as well as the operating conditions at a plurality of locations on each product processing apparatus, are stored in the memory 18 of the information terminal 4a as image information. The image information described above is image information from a plurality of different times, and includes a plurality of still images and moving images (this can be thought of as consisting of images from a plurality of different times).

In this embodiment, the memory 18 of the information terminal 4a has a sufficiently large memory, but a host may be separately provided for storing image information on the communications line 5. This server stores all image information of operating conditions taken by the image-taking component 22, and functions as an image database. When necessary, a user can operate the information terminals 4a to 4c to obtain image information from the host.

In this embodiment, because the product processing apparatuses include a web server, the display of operating information and the settings therefor can be conducted by a web browser on an information terminal. There is no need to connect the information terminals and the product processing apparatuses with a dedicated line, making construction of the control system easy. Furthermore, because ordinary applications can be used as the applications for controlling the operating information, operation of the system is simple. Furthermore, because by using ordinary applications, the operating information can be outputted and set in a variety of forms, restrictions in terms of time and place in the management of the product processing apparatuses can be greatly relaxed. In addition, in this embodiment, the operating information can be printed on a printer on the network. Thus there is no need to connect the product processing apparatuses to a print device.

Other Embodiments (a)

In another embodiment, the image-taking components can be constituted so as to be independent from the RCUs of the product processing apparatuses. In such a case, the image-taking component will have a CPU, control programs, memory, processing programs, a CGI, a web server, an FTP server and the like, and is connected to the communication line via a network interface. Because the RCUs and the information terminals have memory for storing the image information sent to them, the image information can be used for visual inspection, control and the like.

In particular, the RCU of a product processing apparatus, using image information sent from the image-taking component, can store image information of the operating conditions of a plurality of product processing apparatuses, of operating conditions at a plurality of locations of each product processing apparatus, and of operating conditions from different times at each image-taking location. With this system, because operating conditions for the product processing apparatuses are stored as image information from a plurality of different times, a user can see the operating conditions at the point in time or span of time of his or her choosing.

Furthermore, when the RCU of a product processing apparatus detects an abnormality in the apparatus, image information is displayed of the place where the abnormality before and after occurrence of the abnormality. With this system, the operator of a processing device can look at operating conditions before and after occurrence of the abnormality while the product processing device is in operation, facilitating identification of the cause of the abnormality.

An information terminal can receive image information over the communication line from either an image-taking component or from a product processing apparatus, and store the same. Furthermore, the information terminals can be used in the same manner as the RCUs of the product processing apparatuses, for viewing image information, control and the like.

(b)

In the above embodiment, a 10Base-T Ethernet served as the communication line 5; other Ethernet schemes, such as 10Base-2, 10Base-5, 100Base-T, etc., may also be used. The communication line 5 may also be changed to a wireless network. In such a case, the network interface 33 of the product processing apparatuses and the communication interface of the information terminals 4a through 4c may be adapted to work with a wireless network. In other words, any wireless network may be used so long as the product processing apparatuses and the information terminals 4a through 4c can use TCP/IP.

Furthermore, if at one end of the communication line 5, modems, terminal adapters, routers and the like are used, and public lines such as telephone lines are used, interconnection with external networks, such as the Internet, becomes possible. Doing this even further relaxes restrictions on where the system can be used.

(c)

In the first embodiment, the RCU 3 was provided with a network interface 33; it may be further provided with an interface for portable wireless terminals. Doing this allows such interfaces to connect with portable wireless terminals, and allows error information to be sent from a product processing apparatus to a portable wireless terminal of a system administrator.

(d)

In the first embodiment, operating information was presented in the form of HTML documents, but the operating information may be presented in structured documents written in such markup languages as SGML (Standard Generalized Markup Language) and XML (eXtensible Markup Language).

(e)

In the first embodiment, a CGI was used to activate the processing programs 39, but the various processing programs may be executed using SSI (Server Side Includes) and ASP (Active Server Page).

(f)

In the first embodiment, the product processing apparatuses automatically send error information in such formats as email, files, and print data, but error information may be added to the display menu, so that it can be displayed on a web browser.

(g)

In the first embodiment, unique IP addresses were set on the LAN, but DHCP (Dynamic Host Configuration Protocol) may be used to allocate IP addresses dynamically.

(h)

In the first embodiment, information was converted to print data for printing, but in a case where a printer capable of using FTP protocol is used, FTP may be used for printer output.

Industrial Applicability

Through the use of the present invention, image information as well as other operating information is distributed over a network and used in information terminals and product processing apparatuses. Because the image information is thus distributed using ordinary telecommunications means, the system is inexpensive.

Furthermore, because through the use of another aspect of the present invention, image information can be stored, image information relating to the operating conditions of an apparatus can be replayed when an abnormality occurs, and this information can be used as reference material when adjustments are made to apparatuses.

What is claimed is:

1. A production management system, comprising:
   a production line including a plurality of product processing apparatuses, said plurality of product processing apparatuses having at least one combination weigher and bagger;
   a network that connects said plurality of product processing apparatuses;
   a plurality of image-taking means for producing image information by taking images of operating conditions of said product processing apparatuses, said image-taking means being provided at each of said product processing apparatuses, each of said plurality of product processing apparatuses having storage means for storing the image information; and
   image-information-demanding-means for demanding and receiving the image information from said storage means via said network.

2. A production management system according to claim 1, wherein said network is an Ethernet or wireless LAN.

3. A production management system according to claim 1, further comprising
   control means for controlling said product processing apparatuses based on the image information distributed via said network.

4. A production management system according to claim 1, further comprising
   warning means for issuing a warning, said warning means having reference image information and issuing a warning based on comparison between the image information and said reference image information.

5. A system for checking operating conditions of product processing apparatuses, comprising:
   a combination weigher and bagger having storage means;
   image-taking means for producing image information by taking images of operating conditions of said combination weigher and bagger, said storage means storing image information obtained by said image-taking means; and a network that connects said combination weigher and bagger and said image-taking means.

6. A system for checking operating conditions of product processing apparatuses according to claim 5, wherein:

said storage means stores image information from said image-taking means, said image information relating to operating conditions of said combination weigher and bagger taken at a plurality of locations.

7. A system for checking perating conditions of product processing apparatuses according to claim 5, wherein:

said storage means stores image information from said image-taking means, said image information relating to operating conditions of said combination weigher and bagger being taken at different times.

8. A system for checking operating conditions of product processing apparatuses according to claim 5, further comprising abnormality detection means for detecting abnormalities in the operating conditions of said combination weigher and bagger.

9. A system for checking operating conditions of product processing apparatuses according to claim 8, further comprising display means for displaying said image information, wherein:

when detection of abnormality information is received from said abnormality detection means, said display means displays image information of the location where an abnormality has occurred, said image information being taken from before and until after occurrence of said abnormality and stored in said storage means.

10. A system for checking operating conditions of product processing apparatuses in a production line, said system comprising:

a production line including a plurality of product processing apparatuses, said plurality of product processing apparatuses having at least one combination weigher and bagger;

a network that connects said plurality of product processing apparatuses;

image-taking means for taking images of operating conditions of said product processing apparatuses;

first storage means provided in at least one of said plurality of product processing apparatuses for storing image information obtained by said image-taking means; and an image distribution device connected to said first storage means and capable of distributing image information stored by said first storage means.

11. A system for checking operating conditions of product processing apparatuses according to claim 10, further comprising second storage means for storing said image information distributed by said image distribution device.

12. A system for checking operating conditions of product processing apparatuses according to claim 11, wherein:

said second storage means stores at least one of image information of operating conditions of the plurality of product processing apparatuses, image information of operating conditions being taken from a plurality of locations at each product processing apparatus, and image information of operating conditions being taken at different times.

13. A system for checking operating conditions of product processing apparatuses according to claim 10, further comprising abnormality detection means for detecting abnormalities in the operating conditions of the product processing apparatuses.

14. A system for checking operating conditions of product processing apparatuses according to claim 13, further comprising display means for displaying said image information, and second storage means for storing said image information distributed by said image distribution device, wherein:

when detection of abnormality information is received from said abnormality detection means, said display means displays image information of the location where an abnormality has occurred, said image information being taken from before and until after the occurrence of the abnormality and being stored in said second storage means.

* * * * *